United States Patent
Shi (10) Patent No.: US 8,868,144 B2
(45) Date of Patent: Oct. 21, 2014

(54) SMART ANTENNA SYSTEM USING ORIENTATION SENSORS

(75) Inventor: Ping Shi, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 54 days.

(21) Appl. No.: 13/448,110

(22) Filed: Apr. 16, 2012

(65) Prior Publication Data

US 2013/0273870 A1 Oct. 17, 2013

(51) Int. Cl.
*H04M 1/00* (2006.01)
*H04B 1/06* (2006.01)
*H04B 7/00* (2006.01)

(52) U.S. Cl.
USPC .................................. 455/575.7; 455/277.1

(58) Field of Classification Search
USPC .......... 455/456.6, 78, 562.1, 575.7, 101, 103, 455/272, 277.1, 277.2; 375/347
See application file for complete search history.

(56) References Cited

U.S. PATENT DOCUMENTS

| | | | |
|---|---|---|---|
| 6,980,782 B1 | 12/2005 | Braun et al. | |
| 2004/0259563 A1* | 12/2004 | Morton et al. | 455/452.2 |
| 2005/0136842 A1* | 6/2005 | Fan et al. | 455/67.11 |
| 2007/0069969 A1* | 3/2007 | Narita | 343/818 |
| 2007/0111677 A1* | 5/2007 | Eggers et al. | 455/101 |
| 2008/0261539 A1* | 10/2008 | Chen et al. | 455/73 |
| 2009/0156235 A1 | 6/2009 | Johansson et al. | |
| 2010/0330940 A1* | 12/2010 | Sheynblat et al. | 455/129 |
| 2011/0065449 A1 | 3/2011 | Zimmerman | |
| 2012/0064825 A1* | 3/2012 | Landon et al. | 455/39 |
| 2013/0157638 A1* | 6/2013 | Malmbak et al. | 455/418 |

FOREIGN PATENT DOCUMENTS

CN 1384987 A 12/2002

OTHER PUBLICATIONS

Shi, Ping; U.S. Appl. No. 13/343,281; Title: "SAR Control Using Capacitive Sensor and Transmission Duty Cycle Control in a Wireless Device," filed Jan. 4, 2012; Specification 25 pages; 8 Drawing Sheets (Figs. 1-9).
Foreign Communication From A Counterpart Application, PCT Application No. PCT/CN2013/074264, International Search Report dated Jul. 25, 2013, 6 pages.
Foreign Communication From A Counterpart Application, PCT Application No. PCT/CN2013/074264, Written Opinion dated Jul. 25, 2013, 6 pages.

* cited by examiner

*Primary Examiner* — Nguyen Vo
(74) *Attorney, Agent, or Firm* — Conley Rose, P.C.; Grant Rodolph; Nicholas K. Beaulieu (57) ABSTRACT

A wireless device comprising an antenna subsystem having a selectable polarization, at least one sensor configured to provide at least one orientation measurement of the wireless device, and a processor unit coupled to the at least one sensor and configured to receive the at least one orientation measurement, select a polarization of the antenna subsystem based on the at least one orientation measurement, and set the polarization to achieve the selected polarization.

31 Claims, 9 Drawing Sheets

SMART ANTENNA SYSTEM USING ORIENTATION SENSORS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Before the widespread use of wireless phones, such as cell phones or smart phones, for data transmission, phones were used predominantly for voice communication. Wireless phones in a voice communication scenario may be used in a predicable way—the phone may be held vertically, or nearly so, and close to or touching a user's head. As a result, antennas in a phone may be designed for a particular polarization to provide good performance. However, data communications scenarios may change the way the phone is oriented and/or positioned relative to its surroundings as compared to voice communication scenarios. For example, a phone may be rotated so that its screen is viewed in landscape mode for wider screen viewing of video or other internet downloads, or a phone may be attached to a car and tilted for Global Positioning System (GPS) applications. As a result of new use scenarios for data communications, there may be unacceptable levels of polarization losses from antennas designed primarily for voice communication scenarios.

SUMMARY

In one embodiment, the disclosure includes a wireless device comprising an antenna subsystem having a selectable polarization, at least one sensor configured to provide at least one orientation measurement of the wireless device, and a processor unit coupled to the at least one sensor and configured to receive the at least one orientation measurement, select a polarization of the antenna subsystem based on the at least one orientation measurement, and set the polarization to achieve the selected polarization.

In another embodiment, the disclosure includes a method comprising receiving at least one orientation measurement of a wireless device, selecting a polarization of an antenna subsystem based on the at least one orientation measurement, wherein the antenna subsystem has a selectable polarization, and setting the polarization of an antenna subsystem to achieve the selected polarization.

In yet another embodiment, the disclosure includes an apparatus comprising a processor configured to couple to an antenna subsystem and at least one sensor, wherein the antenna subsystem has a selectable polarization, receive at least one orientation measurement from the at least one sensor, select a polarization of the antenna subsystem based on the at least one orientation measurement, and set a polarization of the antenna subsystem to achieve the selected polarization.

In yet another embodiment, the disclosure includes an antenna system having a selectable polarization comprising one or more antennas, and a controller configured to couple to the one or more antennas, and set the antenna system to a polarization from the selectable polarization based on at least one orientation measurement of a wireless device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Systems and methods are disclosed herein for improving performance of wireless communication devices by reducing polarization losses. Systems and methods may use sensor technology to determine orientations and/or aspects of the environment surrounding a device, such as whether a device is in an indoor or outdoor environment. Further, the systems and methods may use antenna component technologies, such as varactors and/or switches, to adaptively select a polarization of an antenna. Consequently, antenna polarization may be adapted depending on inputs from sensors that provide information about device orientation and/or environment to provide improved performance. The systems and methods may be particularly well suited for modern mobile wireless devices that are becoming more data centric with larger screen sizes and form factors that in turn may provide more freedom in antenna placement and design in providing different polarizations.

Figure 1:
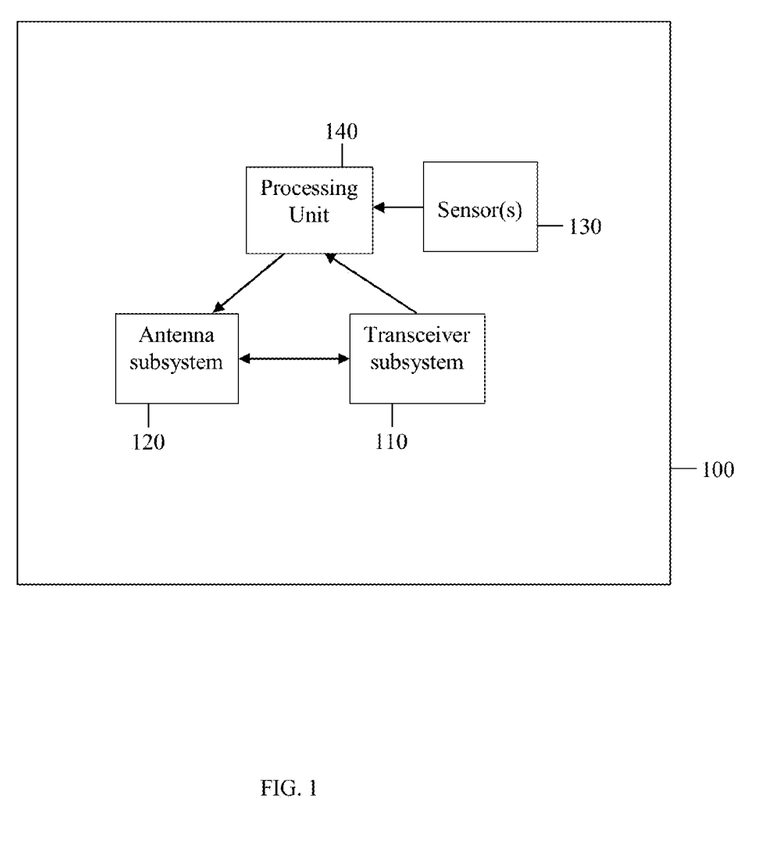
FIG. 1 is an embodiment of a wireless communication device.

FIG. 1 is an embodiment of a wireless device 100. The wireless device may be a wireless phone, such as a cell phone or smart phone, or a tablet computer as examples. The wireless device 100 comprises a transceiver subsystem 110, an antenna subsystem 120, one or more sensors 130, and a processing unit 140 configured as shown in FIG. 1. The transceiver subsystem 110 may be a system that transmits digital information to and receives digital information from antenna subsystem 120 via electrical signals. The electrical signals may be centered at a radio frequency (RF). The transceiver subsystem 110 may comprise components for extracting digital data from an analog signal, such as a local oscillator, a modulator, and channel coder for transmission and a local oscillator, a demodulator, and channel decoder for reception. Some of these components may be implemented in a baseband processor within the transceiver subsystem 110. The transceiver subsystem 110 may compute signal quality information, such as received signal strength indicator (RSSI), and provide this information to the processing unit 140. The antenna subsystem 120 may comprise any type of antenna that converts radio waves to electrical signals when in receive mode and that converts electrical signals to radio waves when in transmit mode. The antenna subsystem 120 may comprise one antenna or multiple antennas. One or more sensors 130 may be configured for determining an orientation and/or an environment of the wireless device 100. The orientation may be a tilt or rotation relative to a vertical direction, and the environment may be an indoor or outdoor environment, as examples. The sensor(s) 130 may include one or more accelerometers, one or more magnetometers, one or more tilt sensors, a GPS device, and/or a proximity sensor, or any combination thereof. Example sensors are described in further detail below. The sensor(s) 130 and transceiver subsystem 110 may be coupled to a processing unit 140 as shown in FIG. 1. The processing unit 140 may be configured to receive inputs from transceiver subsystem 110 and sensor(s) 130 and control a configuration of the antenna system 120, such as the antenna(s) therein. The processing unit 140 may be a separate unit from a baseband processor or may be a baseband processor itself.

Figure 2:
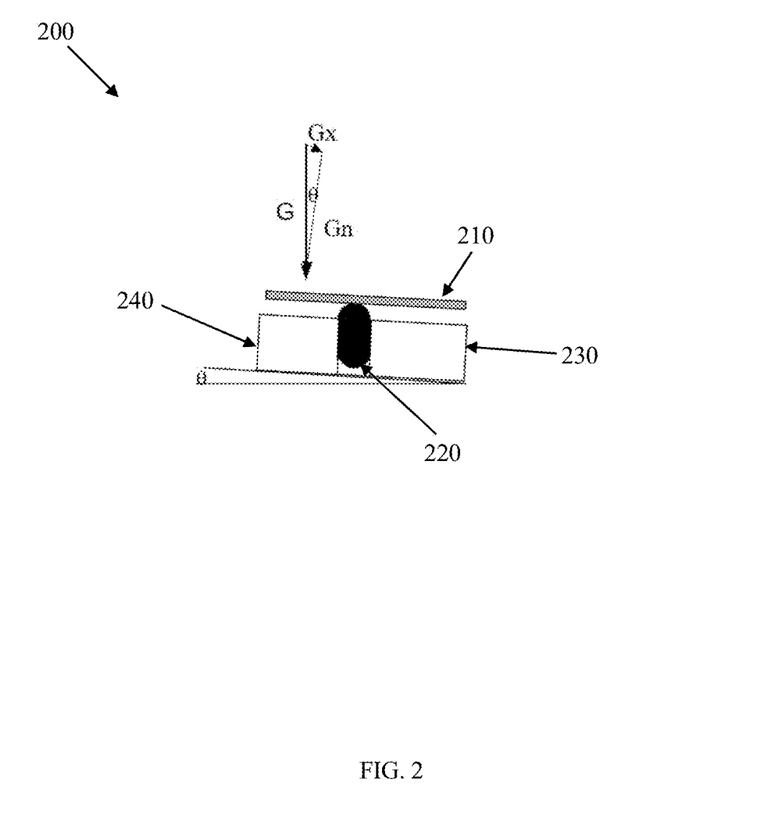
FIG. 2 illustrates one orientation of an embodiment of an accelerometer.
Figure 3:
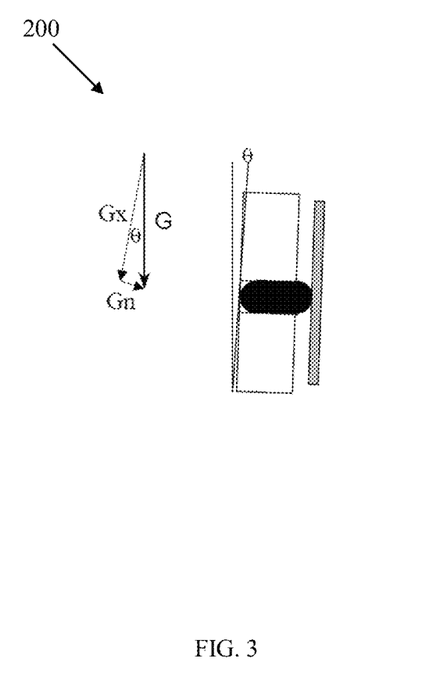
FIG. 3 illustrates a second orientation of an embodiment of an accelerometer.

One example of a sensor that may be used as a sensor in a wireless device, such as one of sensor(s) 130 in wireless device 100, may be an accelerometer. An accelerometer is a device that measures a proper acceleration. A proper acceleration measured by an accelerometer is not necessarily a coordinate acceleration (i.e., a rate of change of velocity). Rather, it may be an acceleration associated with the phenomenon of weight experienced by any test mass at rest in a frame of reference of the accelerometer device. FIG. 2 illustrates one orientation of an embodiment of a single axis accelerometer 200. FIG. 3 illustrates a second orientation of an embodiment of a single axis accelerometer. Referring to FIG. 2, accelerometer 200 may comprise a plate 210 that presses against a mass of insulating material 220, wherein the mass of insulating material 220 may be sandwiched between two other materials 230 and 240. The direction of gravity (g) is illustrated in FIGS. 2 and 3. In FIG. 2, the accelerometer 200 may be considered to be in a "+1 g" orientation, in which a detection axis of the accelerometer 200 may be aligned with the direction of gravity. If the accelerometer 200 is at rest relative to the Earth's surface, the accelerometer may register approximately 1 g. The angle of rotation θ may be computed as $Gn=G*Cos(\theta)$. In FIG. 3, the accelerometer 200 may be considered to be in a "0 g" orientation, in which case the detection axis of the accelerometer is roughly perpendicular to the direction of gravity. The angle of rotation θ may be computed as $Gn=G*Sin(\theta)$. Basically, the single axis accelerometer at rest will measure a projection of the g-force on the specific axis. A three-axis accelerometer may measure a projection of Gn on each axis. Given the projection along three orthogonal axes, a device orientation may be determined.

A second example of a sensor that may be used as a sensor in a wireless device, such as one of sensor(s) 130 in wireless device 100, may be a magnetometer. A magnetometer may use the fact that a direction of the Earth's magnetic field at or near the Earth's surface may be known. In North America, the magnetic field lines point downward toward the north at an angle roughly 70 degrees into the Earth's surface. That is, the magnetic field's angle of inclination is approximately 70 degrees in North America.

Figure 4:
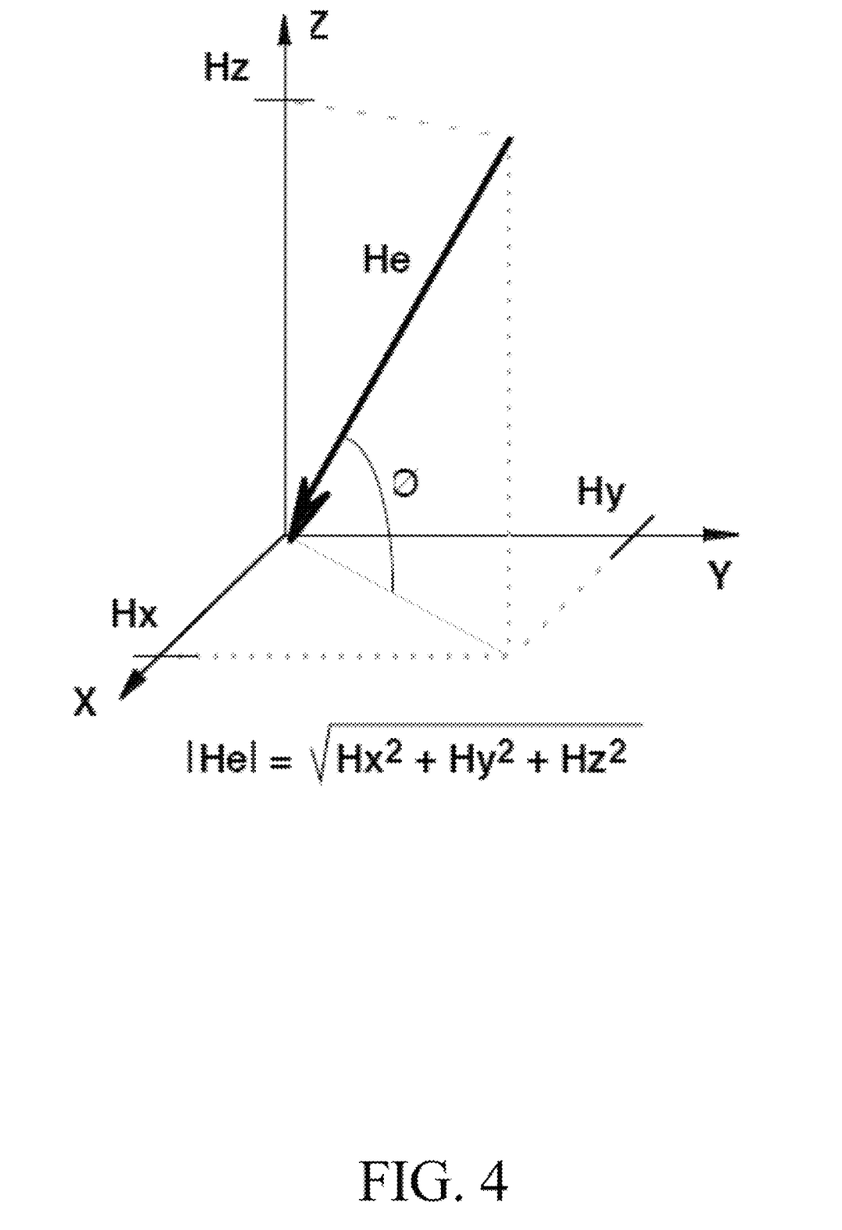
FIG. 4 is an illustration of a local magnetic field orientation due to the Earth's magnetic field.

A magnetometer may measure a direction of a magnetic field. FIG. 4 is an illustration of a local magnetic field orientation due to the Earth's magnetic field. The Earth's magnetic field may be denoted as "He". If a device orientation is referenced using the illustrated X, Y, and Z axes, an orientation of the device may be based on a projection of He on the X, Y, and Z axes and the known orientation of the Earth's magnetic field.

Figure 5:
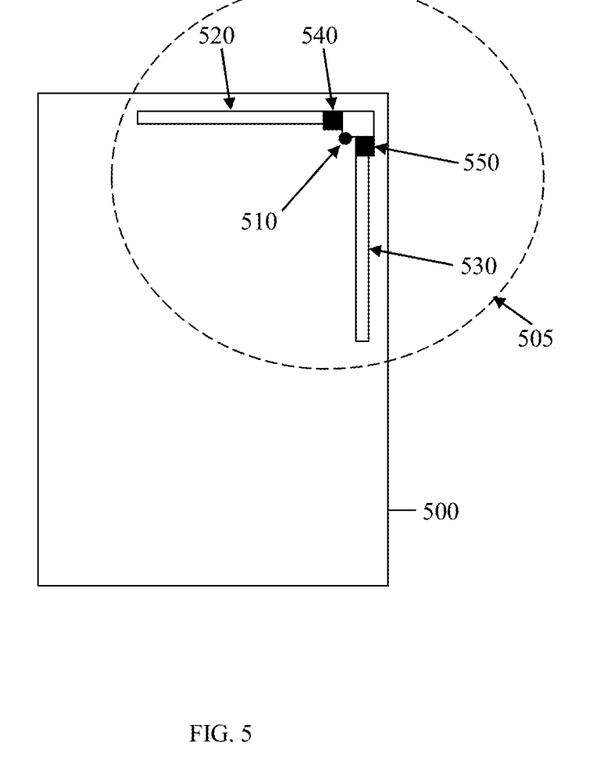
FIG. 5 is an embodiment of a wireless device comprising an embodiment of an antenna subsystem with a switchable polarization.

FIG. 5 is an embodiment of a wireless device 500 comprising an embodiment of an antenna subsystem 505 with a switchable polarization. The antenna subsystem 505 comprises two radiating elements (or radiators) 520 and 530 with a common feed 510. (A radiating element may sometimes be referred to as an antenna.) Each radiator 520 and 530 has different orientation and locates at different part of devices, and thus may provide different polarizations. The antenna subsystem 505 further comprises switch 540 connecting to radiator 520 and switch 550 connecting to radiator 530. Switches 540 and 550 may be low insertion loss RF switches. For the antenna subsystem 505 in FIG. 5, only one of the two switches 540, 550 may be switched "on" at a given time so that only one of the two radiators 520, 530 may be activated. Thus, a polarization of the antenna subsystem 505 may be tunable or switchable and controlled by switches 540 and 550. Additional radiating elements with switches may be used to achieve additional polarizations. Further, different type of radiators can be chosen, either as the active feeding element or as parasitic element. A polarization tunable antenna may comprise, as examples, loop antennas, monopole antenna, inverted F-antenna (IFA), planar inverted F-antennas (PIFA), slot-type antenna. The switches may be placed at various positions, so that a tunable orthogonal polarization may be achieved by changing switch states. The wireless device 500 may, for example, be a smart phone. The wireless device 500 may further comprise a transceiver subsystem, one or more sensors, and a processing unit, such as transceiver subsystem 110, sensor(s) 130, and processing unit 140, respectively, as shown in FIG. 1. As an example embodiment, the status of the switches 540 and 550 (or controller) may be controlled by a processor which is set separately from the switches. According to another embodiment, the two switches 540, 550 may comprise processing functionality or a processor unit capable of processing the input information from the sensor(s), for example, the at least one orientation measurement information or environment information, and controlling the status of the two switches 540, 550 based on the processing result.

Figure 6:
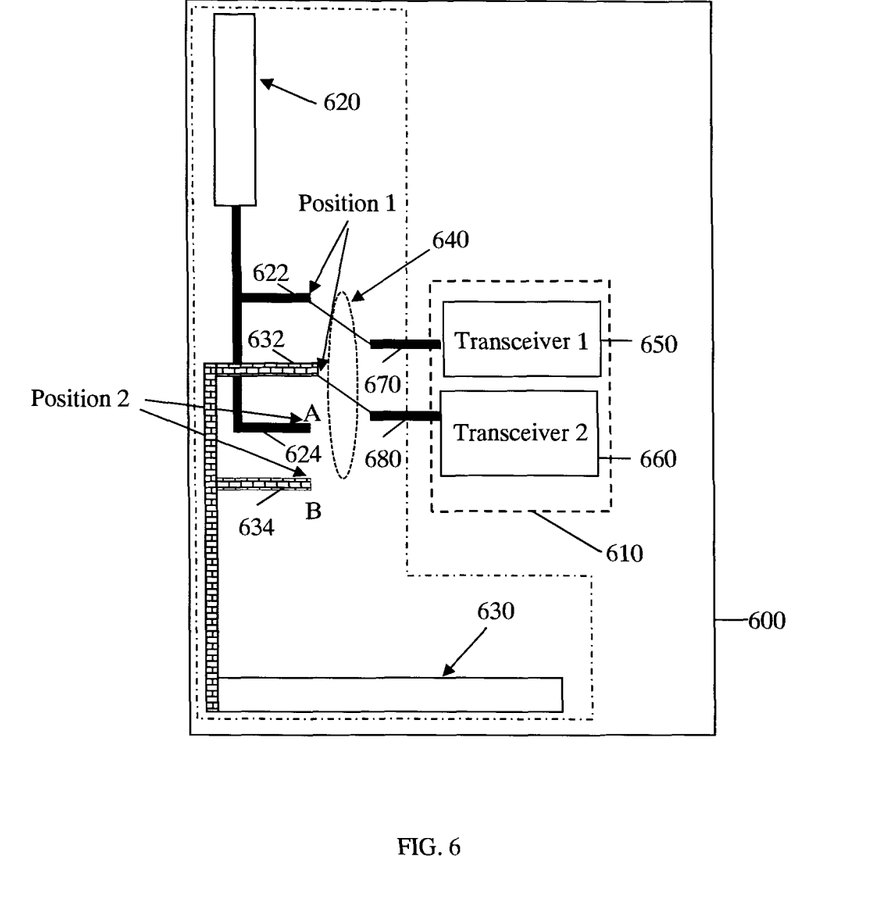
FIG. 6 is an embodiment of a wireless device comprising an embodiment of a multi-antenna subsystem with switchable polarization.

FIG. 6 is an embodiment of a wireless device 600 comprising an embodiment of a multi-antenna subsystem with switchable and near-orthogonal polarization. The wireless device 600 comprises a transceiver subsystem 610 and a multi-antenna subsystem. The multi-antenna subsystem may comprise a first antenna 620, a second antenna 630, and switch/switches 640. In multi-antenna subsystem, the first antenna 620 and second antenna 630 may be configured to transmit and/or receive signals simultaneously. The transceiver subsystem may comprise two transceivers, a first transceiver 650 and second transceiver 660. Both transceiver 650 and transceiver 660 may work simultaneously. Switch/switches 640 may have two possible states — in a first state the first transceiver 650 may be connected to antenna 620 and the second transceiver 660 may be connected to antenna 630 at position one shown in FIG. 6. In a second state the second transceiver 660 may be connected to the first antenna 620 (at contact A) and the first transceiver 650 may be connected to the second antenna 630 (at contact B) at position two as shown in FIG. 6. In this embodiment, each antenna has two contacts (e.g., the first antenna 620 has a first contact 622 and a second contact 624, and the second antenna 630 has a third contact 632 and a fourth contact 634), with one of the two contacts connected to a transceiver at any given time. The transceiver subsystem 610 may be connected to antennas 620 and 630 via microstrip feeds or traces including a first feed line 670 and a second feed line 680, traces, for example, connected by switch/switches 640 as illustrated in FIG. 6. The wireless device 600 may, for example, be a smart phone. The wireless device 600 may further comprise one or more sensor(s) and a processing unit, such as sensor(s) 130 and processing unit 140, respectively, as shown in FIG. 1. As an example embodiment, the status of the switch/switches 640 (or controller) may be controlled by a processor which is set separately from the switches. According to another embodiment, the switch/switches 640 may comprise a processor or a process functionality unit or a processor unit capable of processing the input information from the sensor(s), for example, the at least one orientation measurement information or environment information, and controlling whether the first state is on or the second state is on based on the processing result.

Figure 7:
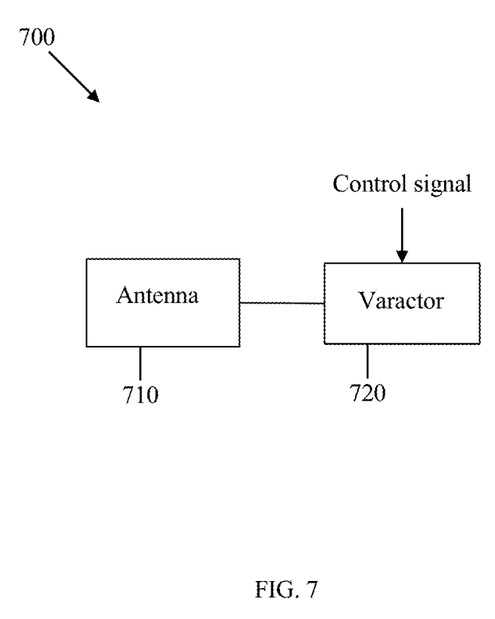
FIG. 7 is an embodiment of a tunable antenna subsystem.

FIG. 7 is an embodiment of a tunable or reconfigurable antenna subsystem 700. The antenna subsystem comprises an antenna 710 and a varactor 720 configured as shown in FIG. 1. Varactor 720 may be a variable capacitor whose capacitance varies as a function of a bias voltage. Varactor 720 may be a microelectromechanical system (MEMS) varactor or a barium-strontium-titanate (BST) varactor, or pin diode or MOS/FET-based semiconductor devices, as examples. Varactor 720 may have high linearity and low insertion loss. Varactor 720 may be configured to receive a control signal that may control a capacitance of the varactor 720. The control signal, for example, may be a voltage signal. The antenna 710 may be configured so that polarization is tunable or reconfigurable depending on a capacitance of the varactor 720. The antenna 710 may be a single antenna. One difference between this antenna subsystem 700 and a switch-tuned antenna subsystem, such as antenna subsystem 505 in FIG. 5, is that more states are available in varactor-tuned antenna.

Figure 8:
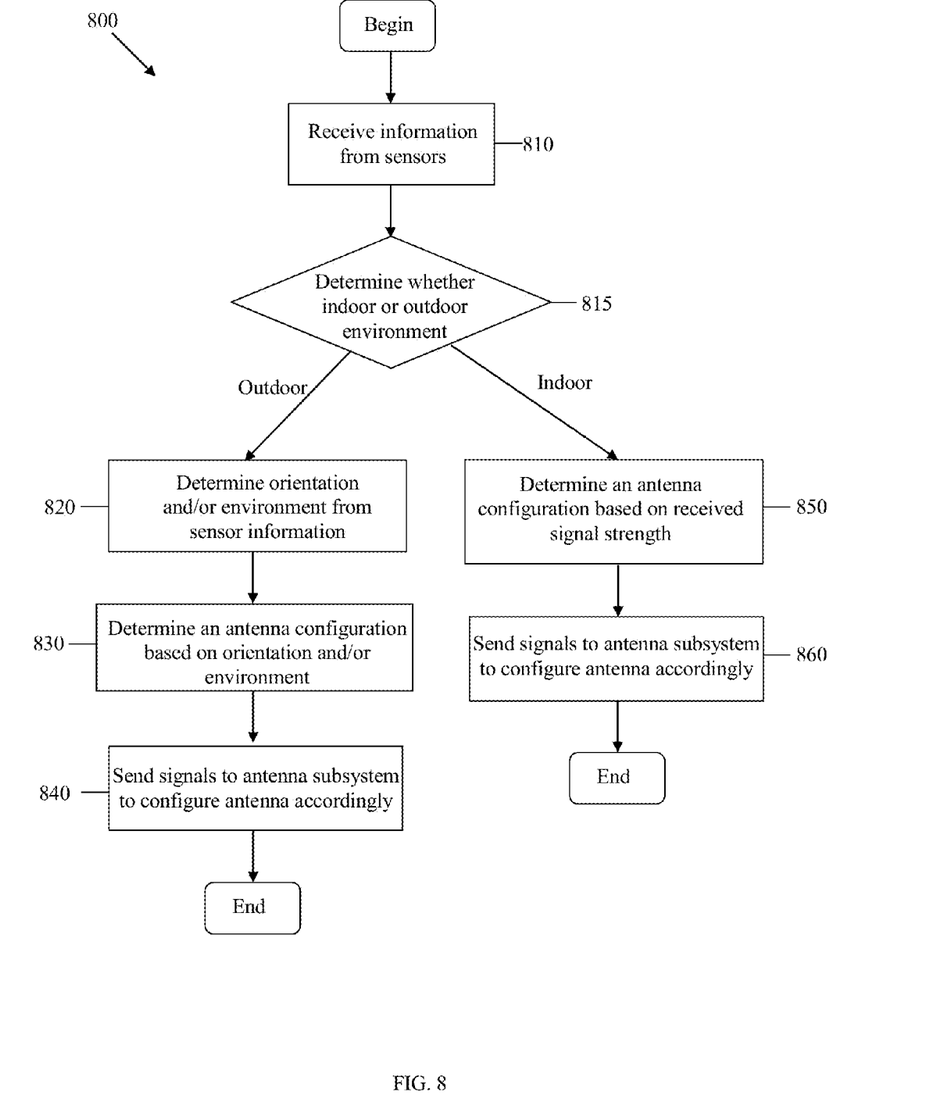
FIG. 8 is an embodiment of a method for configuring an antenna based on sensor information.

FIG. 8 is an embodiment of a method 800 for configuring an antenna based on sensor information. The method may begin in step 810 in which information may be received from one or more sensors, such as a GPS device, an accelerometer, such as accelerometer 200 in FIGS. 2 and 3, a magnetometer, a tilt sensor, or a proximity sensor, such as a proximity sensor described in U.S. patent application Ser. No. 13/343,281 entitled "SAR Control Using Capacitive Sensor and Transmission Duty Cycle Control in a Wireless Device" by Ping Shi, which is hereby incorporated by reference. A tilt sensor may be sensor that produces an electrical output that varies with angular movement. Examples of tilt sensors include force balanced sensors, solid state MEMS sensors, and fluid filled sensors. A proximity sensor may comprise a capacitive sensor comprising one or more capacitors to assist in detecting a presence and a proximity of a human body relative to a wireless device.

One or more sensors may provide information from which a determination whether a wireless device is in an indoor or outdoor environment may be determined in step 815. A wireless device may be classified as being in an outdoor environment if it receives a strong direct-path signal from a base station, for example. Thus, a wireless device may be classified as being "outdoors" if the wireless device is inside a vehicle, for example. A GPS device, for example, in a wireless device may provide information to determine whether the wireless device is in an indoor or outdoor environment. A GPS device can provide such information by providing the speed of the device and the received signal strength code channel energy over noise (C/N). A device with high speed (e.g., greater than 5 meters per second) may not be treated as in an indoor environment. On the other hand, a reported C/N from a GPS may be used to predict the operational environment of a wireless device. A GPS device will report lower C/N, or may not be able to detect and/or receive GPS signals (from a GPS satellite or space vehicle (SV)) if the wireless device is in an indoor environment, whereas a GPS device may be able to receive GPS signals and report more SVs and higher C/N if the wireless device is in an outdoor environment. Thus, whether a GPS device is able to receive GPS signals (from SVs) and a value of a reported C/N may be used to determine if a wireless device comprising the GPS device is in an indoor or outdoor environment.

If the determination is made that the wireless device is in an outdoor environment in step 815, the method proceeds to step 820. In step 820, sensors may provide information from which orientation of and/or the environment surrounding a wireless device may be determined. For example, a 3-axis accelerometer may provide relative orientation to a vertical direction. As another example, a 3-axis magnetometer may provide azimuth, pitch, and roll information for a wireless device, although some correction may be required to determine latitude information. However, latitude information may be obtained from a network identification, base station location, or using a GPS device. As another example, an accelerometer and magnetometer as may be widely available in current smart phones may be used together to resolve any orientation ambiguity. For example, an accelerometer may have orientation ambiguity in a plane perpendicular to a direction of gravity, and a magnetometer may have orientation ambiguity in a plane perpendicular to a direction of the Earth's magnetic field. Furthermore, a proximity device may provide information on the proximity of a human being to a wireless device, and/or whether the device is in close proximity to a metal structure. When the device is in close proximity to a metal structure, a direction of polarization could be changed due to a strong reflection from metal. For example, an indoor antenna selection may be necessary to achieve optimum performance.

In step 830, an antenna configuration may be determined based on wireless device orientation and/or environment determination. The antenna configuration may be determined to reduce or minimize polarization losses between a wireless device and a base station. This may be accomplished, for example, by selecting the antenna configuration whose polarization most closely aligns with a base station antenna polarization. In some embodiments, a base station antenna or antennas may be assumed to be vertically polarized. Most base station antennas use vertical polarization, so this may represent a common use case. For some indoor microcell or picocell deployments, a base station antenna polarization may not be vertical. In an indoor environment, a vertical polarization of the wireless device may result in as much gain as in an outdoor environment because of reflections and rich multipath. In scenarios in which base station antennas may not be vertically polarized, base station polarization information may be stored in a database in a wireless device or base station, which could be indexed by cell id and/or geometric information such as location. If the polarization information is stored in a base station, the base station may communicate the information to a wireless device so that the wireless device could account for base station antenna polarization in its algorithms. The same polarization may be selected for both transmission and reception (i.e., both uplink and downlink) in a wireless device.

Antenna polarization of the mobile device may be characterized and stored in the mobile device. This information may be an orientation of antenna polarization for switchable single antenna or multiple antenna cases, e.g., the cases illustrated in FIG. 5 and FIG. 6, respectively, or a polarization vs. control curve for a tunable single antenna case, e.g., the case illustrated in FIG. 7. Antenna polarization information may be derived from the antenna pattern which may be measured and tuned during an antenna development phase. Antenna polarization may be modeled simply with some known antenna type with some orientation to the device, and the polarization could be characterized by such a model. Saving polarization information may be a low complexity approach. A more sophisticated yet more complex approach may involve using the antenna patterns, i.e. discrete antenna radiation pattern at two polarizations.

In step 840, one or more signals may be transmitted to an antenna subsystem comprising an antenna to configure the antenna subsystem accordingly. For a single switched antenna case, such as illustrated in FIG. 5, in step 840 antenna switch states may be configured to achieve the antenna polarization that aligns best with a corresponding base station. For example, one of switches 540 and 550 may be set to an open state, and the other of switches 540 and 550 may be set to a closed state, thereby enabling one of antennas 520 and 530. For a multiple antenna case, such as illustrated in FIG. 6, in step 840 the best antenna may be switched to a high priority transceiver to achieve the best performance. As in FIG. 6, when a single transceiver 650 is used with multi-antenna system 620 and 630, (i.e., transceiver 660 is not enabled), the transceiver will be connected to the best antenna which polarization is aligned with corresponding base station antenna. When two transceivers are working simultaneously, a high priority transceiver may be switched to the best antenna, i.e., antenna switch states may be configured to achieve the antenna polarization that aligns best with a corresponding base station. If two transceivers have the same priority, a transceiver with the best performance may be switched to the best antenna which polarization aligns best with the corresponding base station. Usually, a transceiver having both a transmitter and a receiver has a higher priority than a transceiver having only a receiver or a transmitter. For example, switch/switches 640 may be set to the position that yields the best polarization for higher priority transceiver 650. For a single tunable antenna case, such as illustrated in FIG. 7, in step 840 the antenna subsystem may be tuned to achieve the antenna polarization that aligns best with a corresponding base station. For example, a control signal may be sent to varactor 720 to achieve the best polarization.

If a determination is made that the wireless device is in an indoor environment in step 815, the method 800 proceeds to step 850. In an indoor environment, a vertical polarization may not yield the best performance, either because the microcell/picocell antenna is not deployed vertically, or multipath elements change the polarization of the received signal. Thus, selecting a polarization of an antenna subsystem to align with a base station polarization, as may be done in a step such as step 830, may not yield the best performance. As a result, a different type of algorithm than used in step 830 may be used in an indoor environment. In step 850, an antenna configuration may be selected based on received signal strength, such as RSSI. For example, a wireless device may try receiving signals using different antenna subsystem configurations and measure RSSI for each configuration, then the best antenna configuration may be chosen based on the RSSI. Antenna reselection may be triggered by a motion of device or a change of environment. Such changes may be detected by an accelerometer (e.g., determining acceleration or orientation), magnetometer (e.g., determining orientation), or proximity sensor (e.g., determining a change of environment). As an alternative, the wireless device may decide to use one antenna subsystem configuration unless the RSSI falls below a certain level, in which case the wireless device may switch to a different antenna subsystem configuration. If a better configuration can be found, the wireless device will use that configuration, and, if not, the original configuration may be restored. After an antenna subsystem configuration is selected in step 850, the method 800 proceeds to step 860 in which one or more signals may be transmitted to an antenna subsystem comprising an antenna to configure the antenna subsystem accordingly.

Figure 9:
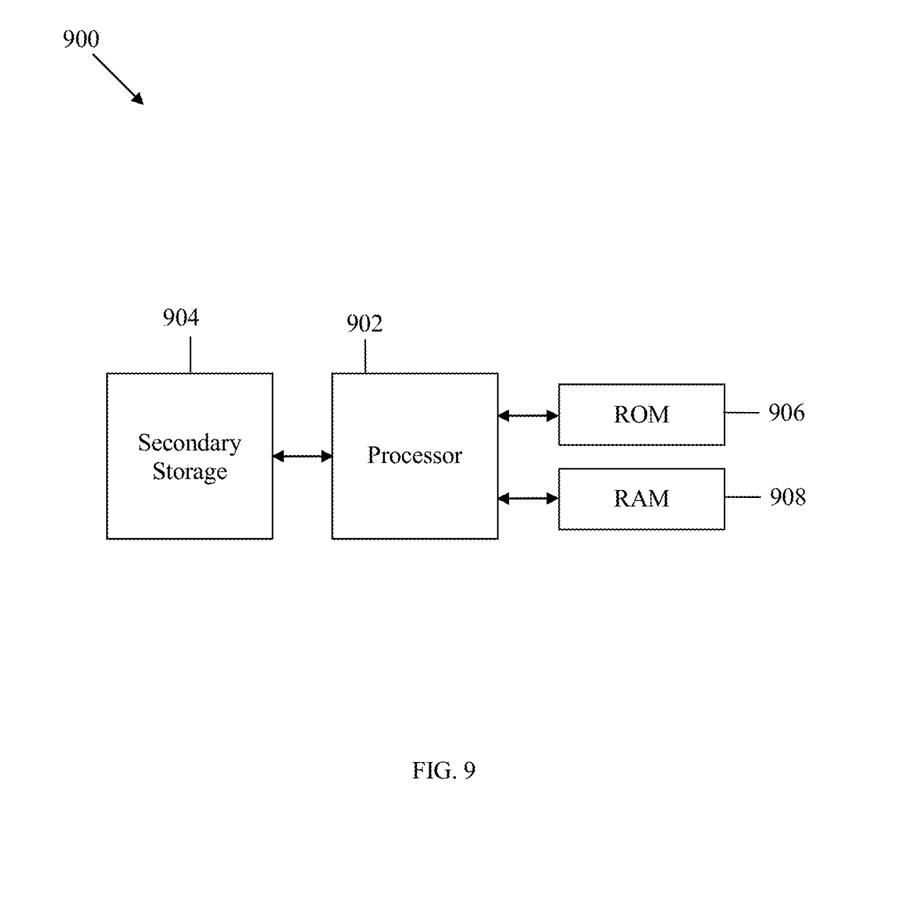
FIG. 9 is an embodiment of a processing unit.

FIG. 9 is an embodiment of a processing unit 900, such as processing unit 140 in FIG. 1. The processing unit 900 includes a processor 902 (which may be referred to as a central processor unit or CPU) that is in communication with memory devices including secondary storage 904, read only memory (ROM) 906, and random-access memory (RAM) 908. The processing unit 900 may be configured to receive information from n sensors, where n is an integer, and may be configured to receive information from a transceiver subsystem, such as transceiver subsystem 110 in FIG. 1. Processor 902 may implement steps similar to those in method 800 for configuring an antenna. The processor 902 may be implemented as one or more central processing unit (CPU) chips, or may be part of one or more application specific integrated circuits (ASICs) and/or digital signal processors (DSPs). The processor 902 may access secondary storage 904, ROM 906, and/or RAM 908, which may store polarization information for an antenna in a wireless device as well as polarization for a base station, to determine the best antenna configuration based on information received from n sensors, such as sensor(s) 130 in FIG. 1 (e.g., processor 902 may implement step 820 of method 800). The processor 902 may be coupled to an antenna subsystem, such as antenna subsystem 120 in FIG. 1, in a wireless device, such as wireless device 100 in FIG. 1. For example, the processor 902 may provide signals to an antenna subsystem to configure an antenna within antenna subsystem based on the best antenna configuration determined by processor 902. For example, if antenna subsystem 505 in FIG. 5 is used, the processor 902 may send signals to switches 540 and 550 to open one switch and close the other to select the best polarity. Similarly and as a second example, if the antenna subsystem in FIG. 6 is used, the processor 902 may send a signal to switch 640 to select position 1 or position 2 corresponding to the best polarity. As a third example, if the antenna subsystem 700 in FIG. 7 is used, the processor 902 may send a control signal to varactor 720 to set the capacitance of the varactor 720 to achieve the best polarization of antenna 710.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A wireless device comprising:
   an antenna subsystem having a selectable polarization;
   at least one sensor configured to provide at least one orientation measurement of the wireless device and provide an indication of an environment of the wireless device;
   a memory configured to store polarization information for different states of the antenna subsystem; and
   a processor unit coupled to the memory and configured to:
      receive the at least one orientation measurement;
      select a polarization of the antenna subsystem based on the at least one orientation measurement and the polarization information for the different states of the antenna subsystem from the memory when the indication of the environment comprises the wireless device being in an outdoor environment;
      select the polarization of the antenna subsystem based on a received signal strength when the indication of the environment comprises the wireless device being in an indoor environment, wherein the received signal strength is measured using different antenna subsystem configurations; and
      set the polarization of the antenna subsystem to achieve the selected polarization.

2. The wireless device of claim 1, wherein the received signal strength comprises a received signal strength indicator (RSSI), wherein the wireless device further comprises a transceiver subsystem configured to measure the RSSI, wherein the processor unit is further configured to receive the RSSI, and wherein the received signal strength is measured using the different antenna subsystem configurations comprises the RSSI being measured using the different antenna subsystem configurations.

3. The wireless device of claim 2, wherein the RSSI is measured using the different antenna subsystem configurations comprises the wireless device receiving signals using the different antenna subsystem configurations and measuring the RSSI for each of the different antenna subsystem configurations.

4. The wireless device of claim 1, wherein the at least one sensor comprises an accelerometer, a magnetometer, a global positioning system (GPS) device, a tilt sensor, or a combination thereof.

5. The wireless device of claim 1, wherein the antenna subsystem comprises a first radiating element coupled to a first switch, and a second radiating element coupled to a second switch, wherein the first switch and the second switch are coupled to the processor unit, and wherein setting the polarization comprises setting states of the first switch and the second switch.

6. The wireless device of claim 1, wherein the antenna subsystem comprises a first radiating element coupled to a first switch, and a second radiating element coupled to a second switch, wherein the processor unit is resident in the first switch and the second switch, and wherein setting the polarization comprises setting states of the first switch and the second switch.

7. The wireless device of claim 1, wherein the antenna subsystem comprises an antenna and a varactor, wherein the varactor is coupled to the processor unit, and wherein setting the polarization comprises setting a capacitance of the varactor.

8. The wireless device of claim 1, wherein the indication of the environment comprises the wireless device being in the outdoor environment, wherein the processor unit is further configured to determine an orientation of the wireless device based on the at least one orientation measurement, and wherein selecting the polarization comprises determining a first polarization of the antenna subsystem for the orientation that most closely aligns with an antenna polarization of a base station.

9. The wireless device of claim 1, wherein the indication of the environment comprises the wireless device being in the indoor environment, and wherein the processor unit is configured to:
  receive a received signal strength indicator (RSSI) for a first polarization; and
  set the polarization to a second polarization when the RSSI is below a threshold.

10. The wireless device of claim 1, wherein the polarization information for the different states of the antenna subsystem comprises multiple algorithms, wherein the multiple algorithms comprise a first algorithm for the outdoor environment and a second algorithm for the indoor environment, wherein the first algorithm comprises selecting the polarization of the antenna subsystem to align with the polarization of a base station antenna, and wherein the second algorithm comprises measuring signal strengths at different polarizations of the antenna subsystem and selecting the polarization of the antenna subsystem that has a highest signal strength.

11. A wireless device comprising:
  an antenna subsystem having a selectable polarization;
  at least one sensor configured to provide at least one orientation measurement of the wireless device;
  a memory configured to store polarization information for different states of the antenna subsystem; and
  a processor unit coupled to the memory and configured to:
    receive the at least one orientation measurement;
    select a polarization of the antenna subsystem based on the at least one orientation measurement and the polarization information for the different states of the antenna subsystem from the memory; and
    set the polarization of the antenna subsystem to achieve the selected polarization,
  wherein the antenna subsystem comprises a first antenna with first and second contacts, a second antenna with third and fourth contacts, and a switch coupled to the processor unit,
  wherein the wireless device further comprises a first transceiver and a second transceiver,
  wherein the switch is configured to connect the first transceiver to the first antenna at the first contact and to connect the second transceiver to the second transceiver at the third contact in a first state,
  wherein the switch is configured to connect the first transceiver to the second antenna at the fourth contact and to connect the second transceiver to the first antenna at the second contact in a second state, and
  wherein setting the polarization comprises setting the state of the switch.

12. A method comprising:
  receiving at least one orientation measurement and an indication of an environment of a wireless device;
  retrieving polarization information for different states of an antenna subsystem of the wireless device from a memory of the wireless device;
  selecting a polarization of the antenna subsystem based on the at least one orientation measurement and the polarization information for the different states of the antenna subsystem from the memory when the indication of the environment comprises the wireless device being in an outdoor environment;
  selecting the polarization of the antenna subsystem based on a received signal strength when the indication of the environment comrises the wireless device being in an indoor environment, wherein the received signal strength is measured using different antenna subsystem configurations; and
  setting the polarization of the antenna subsystem to achieve the selected polarization.

13. The method of claim 12, wherein the received signal strength comprises a received signal strength indicator (RSSI), and wherein selecting the polarization of the antenna subsystem based on the received signal strength when the indication of the environment comprises the wireless device being in the indoor environment comprises selecting the polarization based on the RSSI.

14. The method of claim 13, wherein the received signal strength is measured using the different antenna subsystem configurations comprises the wireless device receiving signals using the different antenna subsystem configurations and measuring the RSSI for each of the different antenna subsystem configurations.

15. The method of claim 12, wherein receiving the at least one orientation measurement comprises receiving an orientation measurement from an accelerometer, a magnetometer, a tilt sensor, or a combination thereof.

16. The method of claim 12, wherein the antenna subsystem comprises a first radiator coupled to a first switch, a second radiator coupled to a second switch, and wherein setting the polarization comprises setting states of the first switch and the second switch.

17. The method of claim 12, wherein the antenna subsystem comprises an antenna and a varactor, and wherein adjusting the polarization comprises setting a capacitance of the varactor.

18. The method of claim 12, wherein the indication of the environment comprises the wireless device being in the outdoor environment, wherein the method further comprises determining an orientation of the wireless device based on the at least one orientation measurement, and wherein selecting the polarization comprises determining a first polarization of the antenna subsystem for an orientation that most closely aligns with an antenna polarization of a base station.

19. The method of claim 12, wherein the indication of the environment comprises the wireless device being in the indoor environment, and wherein the method further comprises:
  receiving a received signal strength indicator (RSSI) for a first polarization; and
  setting the polarization to a second polarization when the RSSI is below a threshold.

20. The method of claim 12, wherein the polarization information for the different states of the antenna subsystem comprises multiple algorithms, wherein the multiple algorithms comprise a first algorithm for the outdoor environment and a second algorithm for the indoor environment, wherein the first algorithm comprises selecting the polarization of the antenna subsystem to align with the polarization of a base station antenna, and wherein the second algorithm comprises measuring signal strengths at different polarizations of the antenna subsystem and selecting the polarization of the antenna subsystem that has a highest signal strength.

21. A method comprising:
  receiving at least one orientation measurement of a wireless device;
  retrieving polarization information for different states of an antenna subsystem of the wireless device from a memory of the wireless device;
  selecting a polarization of the antenna subsystem based on the at least one orientation measurement and the polarization information for the different states of the antenna subsystem from the memory; and
  setting the polarization of the antenna subsystem to achieve the selected polarization,
  wherein the antenna subsystem comprises a first feed line, a first antenna with two selectable connections to the first feed line, a second feed line, and a second antenna with two selectable connections to the second feed line, and a switch, wherein the switch is configured to select the connection of the first antenna to the first feed line and to select the connection of the second antenna to the second feed line, and wherein setting the polarization comprises setting the state of the switch.

22. An apparatus comprising:
a memory configured to store polarization information for different states of an antenna subsystem; and
a processor coupled to the memory and configured to:
 couple to the antenna subsystem and at least one sensor, wherein the antenna subsystem has a selectable polarization;
 receive at least one orientation measurement and an indication of an environment of a wireless device from the at least one sensor;
 select a polarization of the antenna subsystem based on the at least one orientation measurement and the polarization information for the different states of the antenna subsystem from the memory when the indication of the environment comprises the wireless device being in an outdoor environment;
 select the polarization of the antenna subsystem based on a received signal strength when the indication of the environment comprises the wireless device being in an indoor environment, wherein the received signal strength is measured using different antenna subsystem configurations; and
 set the polarization of the antenna subsystem to achieve the selected polarization.

23. The apparatus of claim 22, wherein the processor is further configured to:
 couple to a transceiver subsystem; and
 receive a received signal strength indicator (RSSI) from the transceiver subsystem,
 wherein the received signal rises the RSSI, and
 wherein selecting the polarization is based on the RSSI.

24. The apparatus of claim 23, wherein the at least one sensor comprises a global positioning system (GPS) device, and wherein the processor is configured to determine environment information from reported signal noise ratios for each GPS satellite vehicle from GPS devices whether the wireless device is in the indoor environment or the outdoor environment.

25. The apparatus of claim 22, wherein the polarization information for the different states of the antenna subsystem comprises multiple algorithms, wherein the multiple algorithms comprise a first algorithm for the outdoor environment and a second algorithm for the indoor environment, wherein the first algorithm comprises selecting the polarization of the antenna subsystem to align with the polarization of a base station antenna, and wherein the second algorithm comprises measuring signal strengths at different polarizations of the antenna subsystem and selecting the polarization of the antenna subsystem that has a highest signal strength.

26. An antenna system having a selectable polarization comprising:
one or more antennas;
a memory configured to store polarization information for different switch states of the one or more antennas; and
a controller configured to:
 couple to the one or more antennas and the memory;
 set the antenna system to a polarization from the selectable polarization based on at least one orientation measurement of a wireless device and the polarization information for the different states of the one or more antennas from the memory when an indication of an environment comprises the antenna system being in an outdoor environment; and
 set the antenna system to another polarization from the selectable polarization based on a received signal strength when the indication of the environment comprises the antenna system being in an indoor environment, wherein the received signal strength is measured using different antenna configurations.

27. The antenna system of claim 26, wherein the controller comprises a first switch and a second switch, the first switch is configured to couple to a first antenna, and the second switch is configured to couple to a second antenna, and wherein the controller determines to put the state of the first switch on or the second switch on based on at least one orientation measurement of the wireless device to perform setting the antenna system to the polarization from the selectable polarization.

28. The antenna system of claim 26, wherein the controller comprises a switch comprising a first state and a second state, the first state indicates that a first antenna is connected to a first transceiver and a second antenna is connected to a second transceiver, and the second state indicates that the first antenna is connected to the second transceiver and the second antenna is connected to the first transceiver, and wherein the controller determines to put the switch in the first state or the second state based on at least one orientation measurement of the wireless device to perform setting the antenna system to the polarization from the selectable polarization.

29. The antenna system of claim 28, wherein the controller is further configured to put the switch in the first state or the second state on based on at least one orientation measurement of the wireless device and a priority of the first transceiver and the second transceiver.

30. The antenna system of claim 26, wherein the controller comprises a varactor, and wherein a capacitance of the varactor is controlled according to the at least one orientation measurement of the wireless device to perform setting the antenna system to the polarization from the selectable polarization.

31. The antenna subsystem of claim 26, wherein the polarization information for the different states of the antenna subsystem comprises multiple algorithms, wherein the multiple algorithms comprise a first algorithm for the outdoor environment and a second algorithm for the indoor environment, wherein the first algorithm comprises selecting the polarization of the antenna subsystem to align with the polarization of a base station antenna, and wherein the second algorithm comprises measuring signal strengths at different polarizations of the antenna subsystem and selecting the polarization of the antenna subsystem that has a highest signal strength.

* * * * *

UNITED STATES PATENT AND TRADEMARK OFFICE
CERTIFICATE OF CORRECTION

PATENT NO.         : 8,868,144 B2
APPLICATION NO.    : 13/448110
DATED              : October 21, 2014
INVENTOR(S)        : Ping Shi It is certified that error appears in the above-identified patent and that said Letters Patent is hereby corrected as shown below:

In the Claims

Column 11 lines 49-67, Claim 12 should read:
12. A method comprising:
  receiving at least one orientation measurement and an indication of an environment of a wireless device;
  retrieving polarization information for different states of an antenna subsystem of the wireless device from a memory of the wireless device;
  selecting a polarization of the antenna subsystem based on the at least one orientation measurement and the polarization information for the different states of the antenna subsystem from the memory when the indication of the environment comprises the wireless device being in an outdoor environment;
  selecting the polarization of the antenna subsystem based on a received signal strength when the indication of the environment comprises the wireless device being in an indoor environment, wherein the received signal strength is measured using different antenna subsystem configurations; and
  setting the polarization of the antenna subsystem to achieve the selected polarization.

Column 13 lines 34-40, Claim 23 should read:
The apparatus of claim 22, wherein the processor is further configured to:
  couple to a transceiver subsystem; and
  receive a received signal strength indicator (RSSI) from the transceiver subsystem,
  wherein the received signal strength comprises the RSSI, and
  wherein selecting the polarization is based on the RSSI.

Column 13 lines 59 - Column 14 line 17, Claim 26 should read:
An antenna system having a selectable polarization comprising:
  one or more antennas;
  a memory configured to store polarization information for different states of the one or more antennas; and Signed and Sealed this
Third Day of February, 2015

Michelle K. Lee
*Deputy Director of the United States Patent and Trademark Office*

CERTIFICATE OF CORRECTION (continued)
U.S. Pat. No. 8,868,144 B2

In the Claims
Column 13 line 59 - Column 14 line 17 cont'd.

a controller configured to:
  couple to the one or more antennas and the memory;
set the antenna system to a polarization from the selectable polarization based on at least one orientation measurement of a wireless device and the polarization information for the different states of the one or more antennas from the memory when an indication of an environment comprises the antenna system being in an outdoor environment; and
  set the antenna system to another polarization from the selectable polarization based on a received signal strength when the indication of the environment comprises the antenna system being in an indoor environment, wherein the received signal strength is measured using different antenna configurations.